(12) United States Patent
Takeuchi

(10) Patent No.: US 8,162,789 B2
(45) Date of Patent: Apr. 24, 2012

(54) REDUCTION GEAR BOX

(75) Inventor: Kenichi Takeuchi, Tsu (JP)

(73) Assignee: Nabtesco Corporation, Tokyo (JP)

( * ) Notice: Subject to any disclaimer, the term of this patent is extended or adjusted under 35 U.S.C. 154(b) by 660 days.

(21) Appl. No.: 12/223,034

(22) PCT Filed: Jan. 25, 2007

(86) PCT No.: PCT/JP2007/051197
§ 371 (c)(1),
(2), (4) Date: Jul. 21, 2008

(87) PCT Pub. No.: WO2007/086476
PCT Pub. Date: Aug. 2, 2007

(65) Prior Publication Data
US 2009/0017955 A1    Jan. 15, 2009

(30) Foreign Application Priority Data

Jan. 26, 2006    (JP) .................................. 2006-017391

(51) Int. Cl.
*F16H 1/32* (2006.01)
(52) U.S. Cl. ....................................................... 475/162
(58) Field of Classification Search .................. 475/162, 475/176–179
See application file for complete search history.

(56) References Cited

U.S. PATENT DOCUMENTS

| | | | | |
|---|---|---|---|---|
| 5,042,322 A * | 8/1991 | Hofmann | ........................ | 74/640 |
| 5,950,502 A * | 9/1999 | Genovese | ........................ | 74/640 |
| 6,699,152 B2 * | 3/2004 | Tanaka | ........................ | 475/149 |
| 7,534,184 B2 * | 5/2009 | Tsurumi | ........................ | 475/162 |
| 2004/0254042 A1 | 12/2004 | Tsurumi | | |

FOREIGN PATENT DOCUMENTS

| | | |
|---|---|---|
| JP | A-62-218087 | 9/1987 |
| JP | A-62-233540 | 10/1987 |

(Continued)

OTHER PUBLICATIONS

Supplementary European Search Report mailed Jun. 4, 2009 for European Patent Application No. 07 70 7429.

(Continued)

*Primary Examiner* — Justin Holmes
(74) *Attorney, Agent, or Firm* — Oliff & Berridge, PLC

(57) ABSTRACT

The manufacturing process of a reduction gear box in which a rotation direction converting part and a reduction part are joined together is simplified by unitizing both the rotation direction converting part and the reduction part and by manufacturing the reduction gear box by assembling the rotation direction converting unit and the reduction unit.

The rotation direction converting unit is provided with a first pedestal having a first flat face, an input shaft supported rotatably in the first pedestal, an intermediate shaft substantially orthogonal to the input shaft, a first gear that rotates integrally with the input shaft, and a second gear that engages with the first gear and rotates integrally with the intermediate shaft. The reduction unit is provided with a second pedestal having a second flat face, an internal gear, an external gear housed within the internal gear, and a crank shaft having an eccentric cam that engages with the external gear and causes the external gear to revolve orbitally in the internal gear by revolving eccentrically. The rotation direction converting unit and the reduction unit are fixed while the first flat face and the second flat face are in a surface contacting state.

13 Claims, 8 Drawing Sheets

FOREIGN PATENT DOCUMENTS

| | | |
|---|---|---|
| JP | 64-038352 U | 3/1989 |
| JP | A-08-226498 | 9/1996 |
| JP | A-2003-278783 | 10/2003 |
| JP | A-2004-293640 | 10/2004 |
| JP | A-2005-201352 | 7/2005 |

OTHER PUBLICATIONS

Chinese Office Action dated Oct. 25, 2010 in corresponding Chinese Application No. 200780003631.7 (with translation).

EP Office Action issued in corresponding application EP 07 707 429.2 on Oct. 27, 2009.

Jul. 13, 2011 Search Report issued in European Patent Application No. 11161619.9.

Jun. 30, 2011 Chinese Office Action issued in Chinese Patent Application No. 200780003631.7.

Jan. 20, 2012 Office Action issued in Chinese Application No. 200780003631.7 (with translation).

\* cited by examiner

REDUCTION GEAR BOX

TECHNICAL FIELD

The present application claims priority to Japanese Patent Application No. 2006-017391 filed on Jan. 26, 2006, the contents of which are hereby incorporated by reference into the present specification.

The present invention relates to a reduction gear box utilized in an industrial robot or a machine tool. In particular, the present invention relates to a reduction mechanism that has a unit that transfers torque applied to an input shaft to a intermediate shaft extending in a direction substantially orthogonal to the input shaft, converting the direction of rotation thereof, and a unit for reducing speed utilizing an external gear which revolves orbitally (oscillates) in an internal gear.

BACKGROUND ART

Japanese Patent Application Publication No. S62-218087 sets forth a basic configuration of a reduction mechanism in which an internal gear and an external gear having a differing number of teeth are provided, and that utilizes the phenomenon of there being a discrepancy in rotation revolutions when the external gear is made to revolve orbitally (oscillate) within the internal gear. This type of reduction mechanism utilizes a crank shaft. An eccentric cam that revolves eccentrically when the crank shaft rotates is fixed to the crank shaft, and an external gear engages with the eccentric cam. The eccentric cam revolves eccentrically when the crank shaft rotates, and the external gear engaged with the eccentric cam revolves orbitally (oscillates).

With this type of reduction mechanism, the internal gear rotates if the rotation of the external gear is restrained. In this case, the internal gear rotates around a carrier. Conversely, the external gear rotates if the rotation of the internal gear is restrained. In this case, the external gear rotates while it is revolving orbitally. An output shaft portion which rotates around the orbital rotation center of the external gear is obtained by utilizing a member that is capable of rotating around the orbital rotation center of the external gear and is capable of supporting the external gear such that the external gear is capable of rotation.

It is often desired, in industrial robots or machine tools, that a rotation shaft of a motor and an output shaft of a reduction mechanism have an orthogonal relationship. The use of this layout often has the advantage of decreasing the overall length of a mechanism in which the reduction mechanism has been combined with the motor.

A mechanism in which an intermediate shaft is disposed orthogonally to an input shaft that is operated by the torque of the motor, and which converts the direction of rotation by joining the input shaft and the intermediate shaft by gears, is often utilized when combined with a reduction mechanism. It is possible to transfer the torque to the intermediate shaft from the input shaft that is disposed orthogonally to this intermediate shaft by meshing a pair of bevel gears or a pair of hypoid gears.

A reduction gear box in which a rotation direction converting part and a reduction part are joined together is taught in Japanese Patent Application Publication No. 2004-293640.

DISCLOSURE OF INVENTION

Problem to be Solved by the Invention

When the reduction gear box is utilized in which the rotation direction converting part and the reduction part are joined together, a rotation shaft of a motor and an output shaft of a reduction mechanism can have an orthogonal relationship.

In this type of reduction gear box, it is desirable that the reduction gear box is realized by unitizing the rotation direction converting part and the reduction part, and assembling the unitized rotation direction converting unit and reduction unit together. Such unitization of the rotation direction converting unit and the reduction unit allows the manufacturing process of each unit to be simplified in this reduction gear box, and consequently it is anticipated that the manufacturing process of the reduction gear box can be simplified.

However, in actuality this is difficult. The direction of rotation is converted in the rotation direction converting unit by meshing the pair of gears. If the input shaft and the intermediate shaft are not in a predetermined positions in the respective axial direction at this juncture, the gears will not revolve smoothly, or noise and backlash will become large. It is consequently necessary to fix the input shaft and the intermediate shaft in the predetermined positions in the respective axial direction. Further, the problem appears that load in a radial direction and load in a thrust direction due to torque transmission to a crank shaft at the reduction unit side are applied to the crank shaft and the intermediate shaft, and consequently the size of the structure for supporting the crank shaft and the intermediate shaft must be enlarged.

When the rotation direction converting unit and the reduction unit are separated, it is necessary to join the reduction gear box such that the intermediate shaft at the rotation direction converting unit side and the crank shaft at the reduction unit side are capable of transmitting torque. At this juncture, pressure of the intermediate shaft, which has been adjusted in advance to within a desired range, may deviate from this desired range when the crank shaft at the reduction unit side applies force in the axial direction of the crank shaft to the intermediate shaft at the rotation direction converting unit side. Conversely, pressure of the crank shaft, which has been adjusted in advance to within a desired range, may deviate from this desired range when the intermediate shaft at the rotation direction converting unit side applies force in the axial direction of the intermediate shaft to the crank shaft at the reduction unit side. Due to the aforementioned problems, a configuration has not yet been realized in which a reduction gear box is completed by separating the reduction gear box into a rotation direction converting unit and a reduction unit, completing these two units separately, and by joining these two completed units together.

Means to Solve the Problem

A reduction gear box of the present invention is separated into a rotation direction converting unit and a reduction unit, and the reduction gear box is completed by joining these two units together.

The rotation direction converting unit comprises a first pedestal including a first flat face, an input shaft supported rotatably in the first pedestal, an intermediate shaft supported rotatably in the first pedestal in a position substantially orthogonal to the input shaft, a first gear that rotates integrally with the input shaft, and a second gear that meshes with the first gear and rotates integrally with the intermediate shaft.

The reduction unit comprises a second pedestal including a second flat face making surface contact with the first flat face, an internal gear, an external gear housed within the internal gear, and a crank shaft supported in the second pedestal so as to be capable of rotating with respect to the second pedestal and so as to be incapable of moving in its axial direction. The crank shaft comprises an eccentric cam that engages with the external gear and causes the external gear to revolve orbitally in the internal gear by revolving eccentrically.

In the reduction gear box of the present invention, the rotation direction converting unit and the reduction unit are fixed while the first flat face and the second flat face are in a state of making surface contact. In this positional relationship the intermediate shaft and the crank shaft are coupled such that they are capable of transmitting torque and of moving in the axial direction of the crank shaft, and rotation created by either the internal gear or the external gear with the rotation of the input shaft is transmitted to an output member.

The rotation direction converting unit may be completed as a unit with the first pedestal fixing the position of a torque transmitting system that extends from the input shaft to the intermediate shaft via the first gear and the second gear.

The reduction unit may be completed as a unit with the second pedestal fixing the position of a reduction mechanism that consists of the internal gear, the external gear, the crank shaft, etc.

Since the first flat face is formed in the first pedestal of the rotation direction converting unit and the second flat face is formed in the second pedestal of the reduction unit, the rotation direction converting unit and the reduction unit may be maintained at a constant positional relationship by causing the two to make surface contact at the flat surfaces.

When the position of the rotation direction converting unit and the reduction unit is fixed, the intermediate shaft and the crank shaft are coupled such that torque transmission from the intermediate shaft to the crank shaft is possible and movement in the axial direction of the crank shaft is possible. Various known mechanisms may be adopted as the mechanism for coupling the two shafts to be configured to allow torque transmission and movement in the axial direction of the crank shaft. A particularly sophisticated positional relationship between the two shafts is not necessary for coupling the two shafts such that torque transmission and movement in the axial direction of the crank shaft are possible. The intermediate shaft and the crank shaft are to be coupled in a manner that allows torque transmission and movement in the axial direction of the crank shaft simply by fixing the position of the reduction unit with respect to the rotation direction converting unit.

Since the intermediate shaft and the crank shaft are joined such that movement in the axial direction is enabled, the crank shaft does not apply force to the intermediate shaft in the axial direction of the crank shaft even if the reduction unit is assembled to the rotation direction converting unit. Even if the reduction unit is assembled to the rotation direction converting unit, there is no change in the meshing state of the first gear and the second gear which was predeterminedly adjusted to within a desired range during the process of completing the rotation direction converting unit. Similarly, the intermediate shaft does not apply force in the axial direction of the intermediate shaft to the crank shaft even if the rotation direction converting unit is joined to the reduction unit. The position of the crank shaft, which was predeterminedly adjusted to within a desired range during the process of completing the reduction unit, does not change even if the rotation direction converting unit is assembled to the reduction unit.

The reduction mechanism of the present embodiment may be completed by completing the rotation direction converting unit and the reduction unit separately in advance, and then assembling the two together. The position and pressure which were adjusted beforehand during the process of completing the respective units are not changed by joining the two units together, and it is not necessary to adjust the meshing state of the gears after the two units have been joined.

It is thus possible to manufacture a sophisticated reduction mechanism with simple manufacturing procedures.

It is preferred that the intermediate shaft and the crank shaft are joined by a spline coupling so that torque can be transmitted from the intermediate shaft to the crank shaft, and that the intermediate shaft may move in the axial direction of the crank shaft.

As is commonly known, a spline coupling is a simple coupling method for coupling two shafts such that torque transmission and movement in the coaxial direction is possible. The intermediate shaft and the crank shaft are provided on the same axis, and the two shafts can be coupled together simply by bringing the two together in their axial direction. It is particularly preferred that a spline coupling is utilized for a reduction unit in which the crank shaft does not revolve orbitally.

The intermediate shaft and the crank shaft may be coupled by flat gears that rotate around a shaft parallel to the two shafts so that torque can be transmitted from the intermediate shaft to the crank shaft and that the intermediate shaft may move in the axial direction of the crank shaft.

If the intermediate shaft and the crank shaft are coupled utilizing flat gears that rotate around the shaft parallel to the intermediate shaft and the crank shaft, the intermediate shaft and the crank shaft can be joined so as to be capable of transmitting torque even if the intermediate shaft and the crank shaft change their position in their axial direction, as long as this change in position is within the range of thickness of the flat gears. It is particularly preferred that the flat gears are utilized for a reduction unit in which the crank shaft rotates while it is revolving orbitally.

In the case where the flat gears are utilized, it is preferred that a space is formed between the rotation direction converting unit and the reduction unit under a case where the first flat face and the second flat face have been caused to make surface contact, and that the flat gears that join the intermediate shaft and the crank shaft are housed within this space.

In this case, the flat gears can be isolated from the exterior of the reduction gear box by the first pedestal and the second pedestal.

The technique for simplifying the production process by means of unitizing can be applied not only to separating the rotation direction converting unit and the reduction unit, but also to unitizing the parts relating to the input shaft. An input shaft unit may be utilized in such a technique.

The input shaft unit, which may be assembled together in advance, may comprise an input shaft, a first gear that rotates integrally with the input shaft, an input shaft housing, and a pair of bearings positioned between the input shaft and the input shaft housing, the pair of bearings supporting the input shaft such that the input shaft can rotate with respect to the input shaft housing and cannot move in its axial direction. In this case, the first gear may be in a positional relationship in which the first gear is exposed from the input shaft housing at an anterior end of the input shaft housing.

In a case where this input shaft unit is utilized, a hole may be formed in the first pedestal, and the input shaft unit may be inserted into this hole and fixed, thereby allowing a structure to be realized in which the input shaft and the first gear are supported with respect to the first pedestal so as to be capable of rotation.

Similarly, the technique for simplifying the production process may also be applied to unitizing the parts relating to the second gear and the intermediate shaft. An intermediate shaft unit, which may be assembled together in advance, comprises an intermediate shaft, the second gear that rotates integrally with the intermediate shaft, an intermediate shaft housing, and a pair of bearings positioned between the intermediate shaft and the intermediate shaft housing, the pair of bearings supporting the intermediate shaft such that the intermediate shaft can rotate with respect to the intermediate shaft housing and cannot move in the axial direction. In this case, the second gear may be in a positional relationship in which the second gear is exposed from the intermediate shaft housing at an anterior end of the intermediate shaft housing.

In a case where this intermediate shaft unit is utilized, a second hole may be formed in the first pedestal, and the intermediate shaft unit is inserted into this second hole and is fixed, thereby allowing a structure to be realized in which the intermediate shaft and the second gear are supported with respect to the first pedestal so as to be capable of rotation.

It is preferred that both the input shaft and the intermediate shaft are unitized. In this case, two holes may be formed in the first pedestal. The input shaft unit may be inserted into one of the holes and be fixed, and the intermediate shaft unit may be inserted into the other hole and be fixed, thereby allowing the first gear and the second gear to be meshed. It is possible to complete the assembly of the rotation direction converting unit by inserting the input shaft unit into the former hole and fixing the input shaft unit thereof, and by inserting the intermediate shaft unit into the latter hole and fixing the intermediate shaft unit thereof. Since the input shaft unit and the intermediate shaft unit are fixed utilizing the common pedestal, it may be possible to arrange both units in an accurate positional relationship.

The meshing state of the first gear and the second gear may be adjusted by utilizing a spacer plate (which will later be described in detail) that is provided in the input shaft unit and the intermediate shaft unit respectively. The spacer plates adjust the depth to which the input shaft unit and the intermediate shaft unit are inserted into the pedestal. It is possible to adjust the first gear and the second gear to be meshing under a smoothly revolving state by adjusting the aforementioned depth of insertion.

Rigidity of movement in the axial direction and the radial direction between the input shaft and the input shaft housing may remain impervious even if the meshing state of the first gear and the second gear is adjusted. This is because, even if the depth of insertion of the input shaft unit is adjusted, there is no change in the mutual positional relationship of the input shaft and the input shaft housing since the state of pressure of the bearings supporting the input shaft does not change. There is no need to re-adjust the positional relationship of the input shaft and the input shaft housing even if the meshing state of the first gear and the second gear is adjusted.

Similarly, rigidity of movement in the axial direction and the radial direction between the intermediate shaft and the intermediate shaft housing may remain impervious even if the meshing state of the first gear and the second gear is adjusted. This is because, even if the depth of insertion of the intermediate shaft unit is adjusted, there is no change in the mutual positional relationship of the intermediate shaft and the intermediate shaft housing since the state of pressure of the bearings supporting the intermediate shaft does not change. There is no need to re-adjust the positional relationship of the intermediate shaft and the intermediate shaft housing even if the meshing state of the first gear and the second gear is adjusted.

Although it is preferred that both the input shaft and the intermediate shaft are unitized, it is not necessary to unitize both. The input shaft may be unitized, whereas the second gear and the intermediate shaft may be assembled onto the pedestal. Conversely, the intermediate shaft may be unitized, whereas the first gear and the input shaft may be assembled to the pedestal. The process of completing the assembly of the rotation direction converting unit can be simplified even if only one or the other of the shafts is unitized.

It is preferred that the technique of unitizing both or either of the input shaft and the intermediate shaft, is used in combination with the technique of unitizing the rotation direction converting unit and the reduction unit. However, this is not essential configuration. A sufficient advantage may be obtained by unitizing the input shaft and the intermediate shaft in the case where the reduction gear box is completed by fixing the input shaft unit and/or the intermediate shaft unit to the pedestal for the reduction mechanism. The technique of unitizing both or either of the input shaft and the intermediate shaft may be applied independently of the technique of unitizing the rotation direction converting unit and the reduction unit.

Effects of the Invention

According to the reduction gear box of claim 1, the rotation direction converting unit and the reduction unit can be assembled separately. The reduction gear box can be completed by assembling the reduction unit to the rotation direction converting unit, each of which were completed separately beforehand. The meshing state of the first gear and the second gear can be easily adjusted within the rotation direction converting unit. Further, the meshing state of the first gear and the second gear, which was adjusted in advance to within a desired range during the process of completing the assembly of the rotation direction converting unit, is not affected by the assembling process of joining the reduction unit to the rotation direction converting unit. Similarly, the position of the crank shaft, which was adjusted in advance to within a desired range during the process of completing the assembly of the reduction unit, is not affected by the assembling process of joining the rotation direction converting unit to the reduction unit. It is not necessary to perform an adjustment operation after joining the two units, and it is possible to manufacture a sophisticated reduction gear box using simple manufacturing procedures.

According to the reduction gear box of claim 2, force in the axial direction is not applied to the crank shaft, and it is possible to prevent the operation of the reduction unit from being affected by such force.

According to the reduction gear box of claims 3 and 4, it is possible to couple together the intermediate shaft and the crank shaft, using a simple configuration, such that torque transmission and movement of the intermediate shaft and the crank shaft in the coaxial direction are possible.

According to the reduction gear box of claims 5 and 6, it is possible to complete the input shaft unit and the intermediate shaft unit assembled separately. The rotation direction converting unit can be completed by assembling the input shaft unit and the intermediate shaft unit, both of which have been completed separately beforehand, to the first pedestal. Further, the position in the axial direction of the input shaft and the pressure of the bearings supporting the input shaft, both of which were adjusted in advance to within a desired range during the process of completing the assembly of the input shaft unit, are not changed by engaging the input shaft unit and the intermediate shaft unit. Similarly, the position of the intermediate shaft and the pressure of the bearings supporting the intermediate shaft are not changed. It is not necessary to perform an adjustment operation after assembling the two units, and it is possible to manufacture a sophisticated rotation direction converting unit using a simple procedures. Furthermore, even if the diameters of the first gear and the second gear are large, it is possible to assemble these gears to the first pedestal without utilizing the bearings of a size corresponding to these gears.

BEST MODES FOR CARRYING OUT THE INVENTION

Some of the features of the embodiments will be given.

(Feature 1) The external gear is restrained such that it cannot rotate with respect to the second pedestal.

(Feature 2) A cylinder extending along the axis line of the internal gear is fixed to the internal gear, and this cylinder passes through a hole formed on the external gear near its center.

(Feature 3) In a reduction gear box having the above feature 2, a cable or the like passes through the cylinder.

(Feature 4) The internal gear is fixed to the second pedestal. The crank shaft rotates, while revolving orbitally, around the center of the internal gear. The external gear is supported so as to be capable of revolving eccentrically, and has an output shaft capable of rotating around the center of the internal gear.

(Feature 5) In a reduction gear box having the above feature 4, a cylinder that extends along an axis line of the output shaft is fixed to the output shaft, and a cable or the like passes through the cylinder.

(Feature 6) The first pedestal comprises a first flat face, and a third flat face parallel to the first flat face. The third flat face is utilized while being fixed to an immovable face of an exterior member.

(Feature 7) A disc that is fixed to the revolving internal gear covers an upper part of the external gear.

(Feature 8) A disc that is fixed to the output shaft is positioned above the internal gear.

(Feature 9) The first pedestal and the second pedestal are the base of a robot, and an arm of the robot is attached to the output shaft of the reduction gear box.

EMBODIMENTS

Embodiments will be described in detail below with reference to the figures.

First Embodiment

Figure 1:
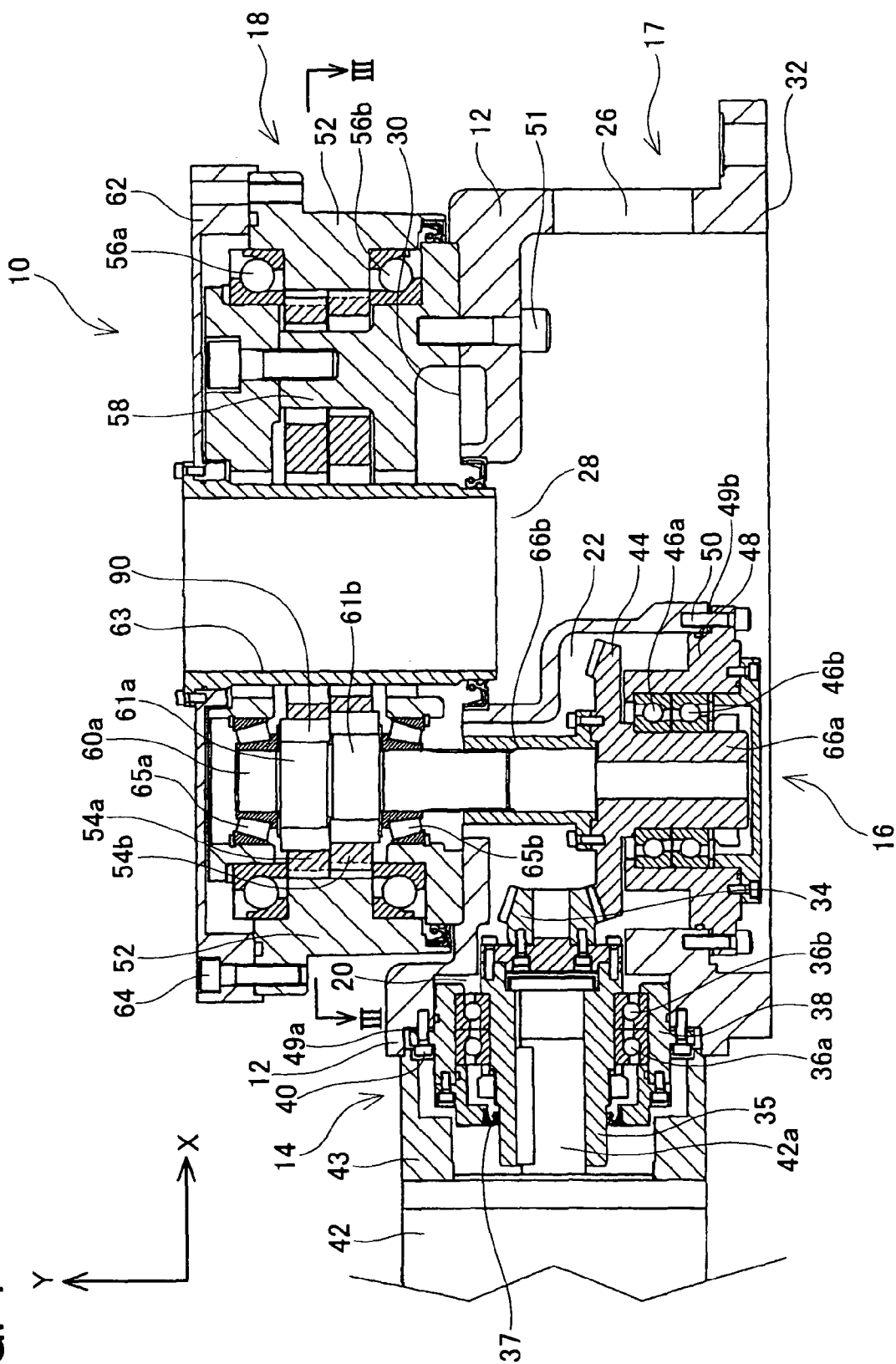
FIG. 1 shows a reduction gear box of a first embodiment.

FIG. 1 shows a cross-sectional view of essential parts of a reduction gear box 10 of the present embodiment. The reduction gear box 10 is formed by assembling together a rotation direction converting unit 17 and a reduction unit 18. The rotation direction converting unit 17 is formed by assembling an input shaft unit 14 and an intermediate shaft unit 16 to a first pedestal 12.

Figure 2:
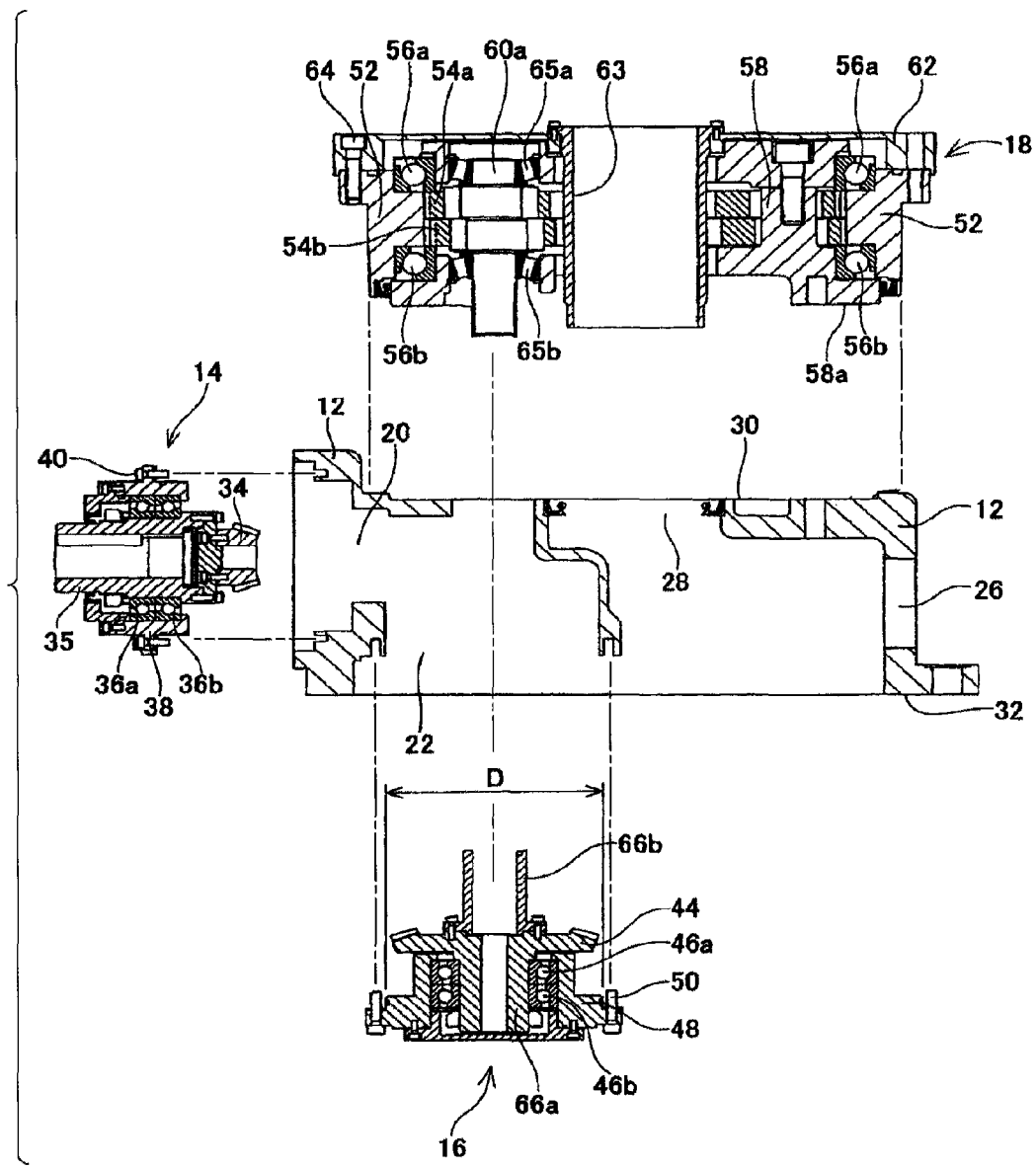
FIG. 2 shows the positional relationship of components in a manufacturing process of the reduction gear box of the first embodiment.

FIG. 2 shows the input shaft unit 14, the intermediate shaft unit 16, the reduction unit 18, and the first pedestal 12 prior to assembly, the reduction gear box 10 being completed by joining the input shaft unit 14, the intermediate shaft unit 16, and the reduction unit 18 to the first pedestal 12. The reduction gear box 10 is usually completed by first assembling the rotation direction converting unit 17 by joining the input shaft unit 14 and the intermediate shaft unit 16 to the first pedestal 12, and then assembling the reduction unit 18, which has been completed separately from the rotation direction converting unit 17, to the first pedestal 12.

As shown in FIG. 2, the first pedestal 12 comprises a first hole 20 into which the input shaft unit 14 is inserted, a second hole 22 into which the intermediate shaft unit 16 is inserted, a hole 26 for leading a power source cable or the like (for example, a power source cable, a signal wire, an air tube, wiring, etc.) to the interior of the reduction gear box 10, and a hole 28 for leading a power source cable or the like to the exterior of the reduction gear box 10. Furthermore, the first pedestal 12 has a first flat face 30 for fixing the position of the reduction unit 18, and a third flat face 32 for fixing the reduction gear box 10 to an immovable face of a member for which the reduction gear box is to be utilized.

The input shaft unit 14 comprises an input shaft 35, a first gear (a bevel gear) 34 that rotates integrally with the input shaft 35, an input shaft housing 38, and a pair of angular ball bearings 36a and 36b that are positioned between the input shaft 35 and the input shaft housing 38 and that support the input shaft 35 such that the input shaft 35 can rotate with respect to the input shaft housing 38 and cannot move in its axial direction, all of these being joined together in advance. The first gear 34 is joined in the input shaft unit 14 with a positional relationship such that the first gear 34 is exposed from the input shaft housing 38 at an anterior end thereof. The diameter of the first gear 34 is smaller than the diameter of the input shaft housing 38, and the first gear 34 can pass through the first hole 20 for fixing the input shaft housing 38. The input shaft unit 14 is fixed to the first pedestal 12 by inserting the input shaft unit 14 into the first hole 20 from the first gear 34 side, and tightening a bolt 40.

The intermediate shaft unit 16 comprises intermediate shafts 66a and 66b, a second gear (a bevel gear) 44 that rotates integrally with the intermediate shafts 66a and 66b, an intermediate shaft housing 48, and a pair of angular ball bearings 46a and 46b that are positioned between the intermediate shaft 66a and the intermediate shaft housing 48 and that support the intermediate shaft 66a such that the intermediate shaft 66a can rotate with respect to the intermediate shaft housing 48 and cannot move in its axial direction, all of these being joined together in advance. The second gear 44 is joined in the intermediate shaft unit 16 with a positional relationship such that the second gear 44 is exposed from the intermediate shaft housing 48 at an anterior end thereof. The diameter of the second gear 44 is smaller than the diameter D of a boss part of the intermediate shaft housing 48, and the second gear 44 can pass through the second hole 22 for fixing the intermediate shaft housing 48. The intermediate shaft unit 16 is fixed to the first pedestal 12 by inserting the intermediate shaft unit 16 into the second hole 22 from the second gear 44 side, and tightening a bolt 50. The intermediate shafts 66a and 66b are fixed integrally, and a plurality of grooves (inner spline grooves) for spline coupling extend in the axial direction of the intermediate shaft 66b along an inner circumference thereof.

Moreover, it is preferred that the combination of the first gear 34 and the second gear 44 is an orthogonal gear combination; for example, bevel gears, hypoid gears, etc.

The first gear 34 and the second gear 44 mesh when the input shaft unit 14 and the intermediate shaft unit 16 are fixed to the first pedestal 12. The input shaft 35 and the intermediate shafts 66a and 66b are orthogonal to one another. The direction of rotation of the input shaft is changed by the first gear 34 and the second gear 44 engaging with one another.

Since the input shaft unit 14 and the intermediate shaft unit 16 are mutually fixed to the first pedestal 12, the positional relationship of the two is adjusted accurately. The first gear 34 and the second gear 44 are adjusted to a satisfactory meshing state in which a suitable space is maintained by spacer plates 49a and 49b.

In order to adjust the meshing state of the first gear 34 and the second gear 44 to an appropriate state, it is possible to adjust, as necessary, the depth to which the input shaft unit 14 and the intermediate shaft unit 16 are inserted into the first pedestal 12. Even if the depth of insertion of the input shaft unit 14 is adjusted, there may be no change in the restraining strength with which the pair of angular ball bearings 36a and 36b restrain the input shaft 35 with respect to the input shaft housing 38 such that the input shaft 35 cannot move in its axial direction. This is because the pressure of the bearings 36a and 36b supporting the input shaft 35 does not change and the positional relationship of the input shaft 35 and the input shaft housing 38 does not change even if the depth of insertion of the input shaft unit 14 is adjusted. Similarly, even if the depth of insertion of the intermediate shaft unit 16 is adjusted, there is no change in the restraining strength with which the pair of angular ball bearings 46a and 46b restrain the intermediate shaft 66a with respect to the intermediate shaft housing 48 such that the intermediate shaft 66a cannot move in its axial direction. This is because the pressure of the bearings 46a and 46b supporting the intermediate shaft 66a does not change and the positional relationship of the intermediate shaft 66a and the intermediate shaft housing 48 does not change even if the depth of insertion of the intermediate shaft unit 16 is adjusted.

The rotation direction converting unit 17 is completed by completing the input shaft unit 14 and the intermediate shaft unit 16 separately in advance, and then joining these to the common first pedestal 12. It is not necessary to re-adjust the input shaft unit 14 and the intermediate shaft unit 16 after they have been joined to the first pedestal 12.

The reduction unit 18 comprises a second pedestal 58, an internal gear 52, external gears 54a and 54b housed within the internal gear 52, and a crank shaft 60a supported with respect to the second pedestal 58 such that this crank shaft 60a can rotate and cannot move in its axial direction.

A second flat face 58a that makes surface contact with the first flat face 30 of the first pedestal 12 is formed in the second pedestal 58. The internal gear 52 is supported by a pair of angular ball bearings 56a and 56b such that the internal gear 52 can rotate with respect to the second pedestal 58. The two external gears 54a and 54b are housed within the internal gear 52. The two external gears 54a and 54b overlap in an up-down direction.

Figure 3:
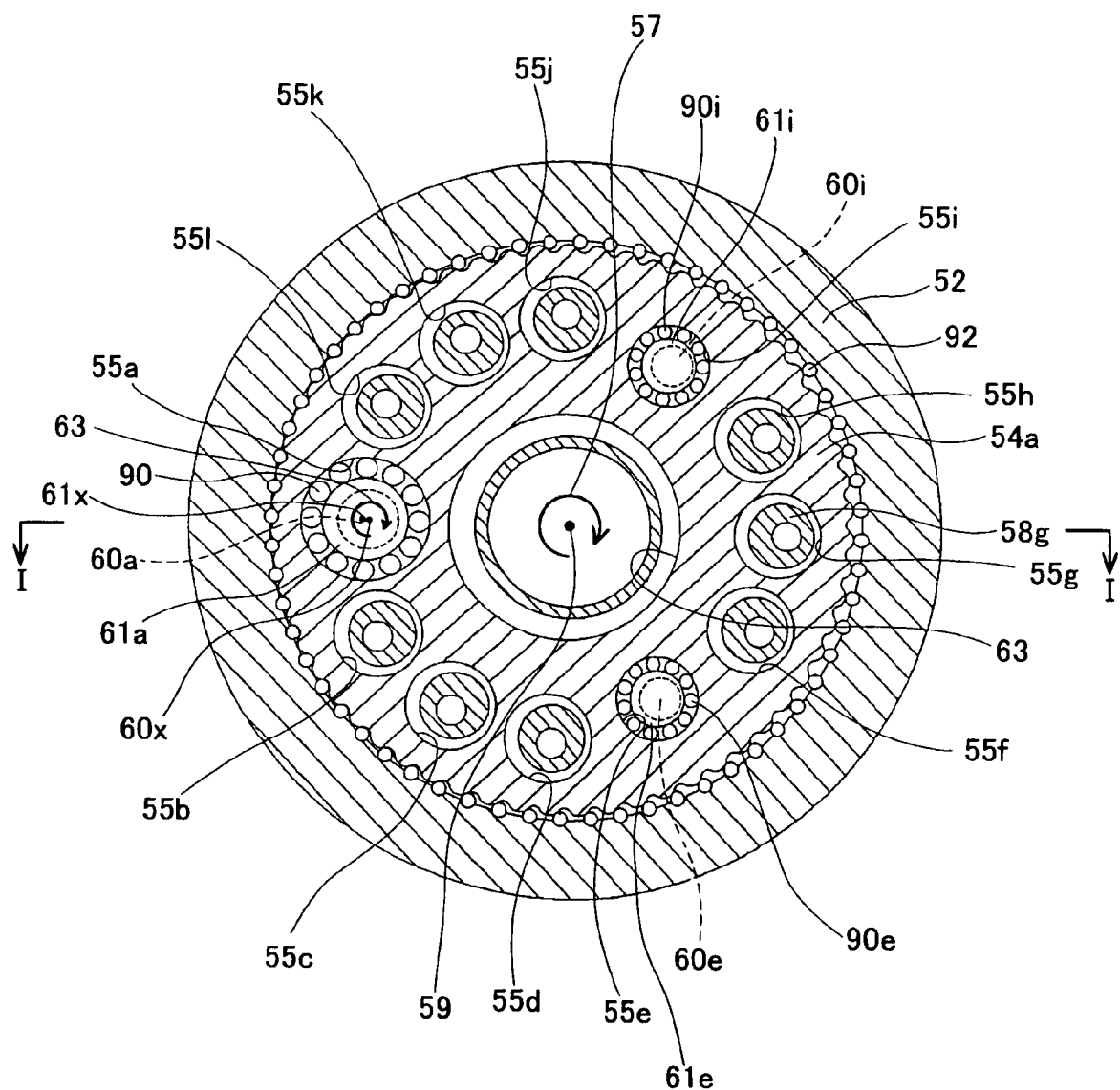
FIG. 3 shows a cross-sectional view along the line III-III of FIG. 1.

FIG. 3 shows a cross-sectional view along the line III-III of FIG. 1. As shown in FIG. 3, a total of twelve holes 55a to 55l are formed in a circumference direction in the external gear 54a. Nine columns 58b to 58d, 58f to 58h, and 58j to 58l (for the sake of clarity in the figure, reference numbers of the columns other than 58g have been omitted) are formed in the second pedestal (carrier) 58, and are inserted into the corresponding holes 55b to 55d, 55f to 55h, and 55j to 55l of the external gear 54a.

The external gear 54a is smaller in diameter than the internal gear 52, and the number of teeth of the external gear 54a is one less than the number of teeth of the internal gear 52. When the external gear 54a is in an meshing state with the internal gear 52 via an inner pin 92, the external gear 54a is capable of orbital revolution around a center 59 as shown by the arrow 57. A space sufficient to allow the orbital revolution 57 of the external gear 54a is maintained between the holes 55b to 55d, 55f to 55h, and 55j to 55l of the external gear 54a and the columns 58b to 58d, 58f to 58h, and 58j to 58l of the second pedestal 58. When the external gear 54a revolves in the orbital revolution 57 while the rotation of this external gear 54a is being restrained, the internal gear 52 rotates due to the number of teeth of the external gear 54a being less than the number of teeth of the internal gear 52. In the case of the present embodiment, the number of teeth of the external gear 54a is one less than the number of teeth of the internal gear 52, and since the internal gear 52 has 60 teeth, the internal gear 52 rotates a ¹⁄₆₀ of a rotation for one orbital revolution of the external gear 54a.

The reference number 60a refers to the crank shaft, this crank shaft 60a being supported with respect to the second pedestal 58 such that it can rotate around a center 60x. The reference number 61a refers to an eccentric cam formed with the crank shaft 60a, the outer shape of this eccentric cam 61a being round, and a center 61x of this round shape being offset from the rotation center 60x of the crank shaft 60a. In the state of FIG. 3, the center 61x of the eccentric cam 61 is offset to the left from the rotation center 60x of the crank shaft 60a. The eccentric cam 61a engages with the hole 55a of the external gear 54a via a needle bearing 90. When the crank shaft 60a rotates around the rotation center 60x, the center 61x of the eccentric cam 61 revolves orbitally around the rotation center 60x of the crank shaft 60a as shown by the arrow 63. When the center 61x of the eccentric cam 61a rotates orbitally as shown by the arrow 63, the external gear 54a revolves orbitally as shown by the arrow 57. The trajectory of orbital revolution 63 and the trajectory of orbital revolution 57 are identical.

The reference numbers 60e and 60i refer to crank shafts, these being rotatably supported with respect to the second pedestal 58. The reference numbers 61e and 61i refer to eccentric cams formed with the crank shafts 60e and 60i, the outer shape of these eccentric cams 61e and 61i being round, and a center of this round shape being offset from the rotation center of the crank shafts 60e and 60i. In the state of FIG. 3, the centers of the eccentric cams 61e and 61i are offset to the left from the rotation centers of the crank shafts 60e and 60i. The eccentric cams 61e and 61i respectively engage with the holes 55e and 55i of the external gear 54a via needle bearings 90e and 90i. When the crank shaft 60a rotates, the centers of the eccentric cams 61e and 61i revolves orbitally around the rotation centers of the crank shafts 60e and 60i respectively, and the external gear 54a revolves orbitally as shown by the arrow 57.

The hole 63 is formed in a central portion of the external gear 54.

The description above also applies to the external gear 54b. However, the direction of the cam being offset is in the reverse direction. In the state of FIG. 3, the center of the eccentric cam for the external gear 54b is offset to the right from the rotation center 60x of the crank shaft 60a. The center of the eccentric cam for the external gear 54a and the center of the eccentric cam for the external gear 54b are always positioned symmetrically with respect to the rotation center 60x of the crank shaft 60a at the center of the symmetry. That is, in FIG. 3, if the external gear 54a is offset in the left direction, then the external gear 54b is offset in the right direction; if the external gear 54a is offset in the upward direction, then the external gear 54b is offset in the downward direction; if the external gear 54a is offset in the right direction, then the external gear 54b is offset in the left direction; and if the external gear 54a is offset in the downward direction, then the external gear 54b is offset in the upward direction. That is, in view of the entirety of the external gear 54a, the external gear 54b, and the crank shaft, the external gear 54a and the external gear 54b are positioned symmetrically with respect to the rotation center of the crank shaft 60a, and a relationship is realized in which rotational balance is maintained.

As shown in FIG. 1, the crank shaft 60a is supported with respect to the second pedestal 58 by a pair of tapered roller bearings 65a and 65b such that the crank shaft 60a can rotate and cannot move in its axial direction. Since a predetermined pressure is applied to the pair of tapered roller bearings 65a and 65b, the crank shaft 60a cannot move in the axial direction thereof with respect to the second pedestal 58.

When the second flat face 58a is caused to make surface contact with the first flat face 30 and the reduction unit 18 is fixed in position in the first pedestal 12, the crank shaft 60a and the intermediate shaft 66b are set in a relationship where they are coaxially positioned. As described earlier, a plurality of grooves extending in the coaxial direction are formed on an inner face of the intermediate shaft 66b. A plurality of protruding ridges (splines) extending in the axial direction of the crank shaft 60a are formed so as to correspond thereto on an outer face of the crank shaft 60a. When the crank shaft 60a is inserted into the intermediate shaft 66b, the grooves and ridges extending in the coaxial direction mutually interlock with each other, and a spline coupling of the crank shaft 60a with the intermediate shaft 66b is achieved. That is, torque is transmitted from the intermediate shaft 66b to the crank shaft 60a, whereas force in the coaxial direction is not applied between the intermediate shaft 66b and the crank shaft 60a.

The compressing force (pressure) applied from the second pedestal 58 to the crank shaft 60a by the pair of tapered roller bearings 65a and 65b is not changed by the assembly of the reduction unit 18 and the rotation direction converting unit 17. Similarly, the engaged state of the first gear 34 and the second gear 44 is not changed by the assembly of the reduction unit 18 and the rotation direction converting unit 17. When the reduction unit 18 and the rotation direction converting unit 17 are each completed separately, it is not necessary to re-adjust the pressure or the engaged state after the two have been joined together.

As described above, the internal gear 52 rotates around the center 59 of FIG. 3 with respect to the second pedestal 58. A plate 62 is fixed to the internal gear 52 by bolts 64, and a cylinder 63 is fixed to a central part of the plate 62. A power source cable, etc. can be passed through the interior of the cylinder 63 from the hole 26.

While the second flat face 58a and the first flat face 30 are making surface contact, the second pedestal 58 of the reduction unit 18 is fixed to the first pedestal 12 of the rotation direction converting unit 17 by bolts 51. The reduction gear box 10 is completed by fixing the rotation direction converting unit 17 and the reduction unit 18.

The manufacturing method of the reduction gear box 10 of the present embodiment will now be described. FIG. 2 shows a cross-sectional view of essential parts of the reduction gear box 10, showing the first pedestal 12, the input shaft unit 14, the intermediate shaft unit 16, and the reduction unit 18 in a disassembled state. The first pedestal 12, input shaft unit 14, intermediate shaft unit 16, and reduction unit 18 are formed separately as disclosed below.

The first pedestal 12 is provided with the first hole 20 into which the input shaft unit 14 is inserted, the second hole 22 into which the intermediate shaft unit 16 is inserted, the hole 26 for leading a power source cable or the like into the rotation direction converting unit 17, the hole 28 for leading a power source cable or the like to the reduction gear box 10, the first flat face 30 for fixing the position of the reduction unit 18, and the third flat face 32 for fixing the reduction gear box 10.

The input shaft unit 14 is assembled before being inserted into the first pedestal 12. The intermediate shaft unit 16 is also assembled before inserted into the first pedestal 12. The reduction unit 18 is also assembled before being fixed to the first pedestal 12. At this juncture, the crank shaft 60a is prevented from moving in the axial direction with respect to the second pedestal 58 by applying pressure to the pair of bearings 65a and 65b.

Next, the input shaft unit 14 is inserted into the first hole 20 of the first pedestal 12, and the intermediate shaft unit 16 is inserted into the second hole 22 of the first pedestal 12. The meshing of the first gear 34 and the second gear 44 is adjusted, and the input shaft unit 14 and the intermediate shaft unit 16 are fixed to the first pedestal 12. At this juncture, it is not necessary to re-adjust the pressure applied to the bearings 36a and 36b of the input shaft unit 14 or the pressure applied to the bearings 46a and 46b of the intermediate shaft unit 14. The rotation direction converting unit 17 is assembled in this step. Next, the second flat face 58a of the reduction unit 18 is caused to make surface contact with the first flat face 30 of the rotation direction converting unit 17, thus bringing the reduction unit 18 and the rotation direction converting unit 17 into a desired positional relationship, and the second pedestal 58 and the first pedestal 12 are fixed by the bolts 51. At this juncture, the crank shaft 60a is inserted into the intermediate shaft 66b, and the spline coupling of the crank shaft 60a with the intermediate shaft 66b is achieved. The reduction gear box 10 is manufactured by means of the manufacturing method described above. Since the crank shaft 60a and the intermediate shaft 66b have a spline coupling, and force in their coaxial direction is not applied between the crank shaft 60a and the intermediate shaft 66b, it is not necessary to re-adjust the pressure applied to the crank shaft 60a of the reduction unit 18, the pressure applied to the input shaft 35 of the input shaft unit 14, or the pressure applied to the intermediate shaft 66a of the intermediate shaft unit 14 after the reduction unit 18 and the rotation direction converting unit 17 have been joined together. Adjustment to the engagement of the first gear 34 and the second gear 44 can be realized simply by adjusting the thickness of the spacer plates 49a and 49b.

The operation of the reduction gear box 10 of the present embodiment will now be described. The reduction gear box is utilized while the third flat face 32 of the first pedestal 12 of the rotation direction converting unit 17 is fixed to an immovable surface of a base plate or the like. A motor 42 is fixed to the first pedestal 12. At this juncture, an output shaft 42a of the motor 42 is coupled to the input shaft 35 such that torque transmission is possible. Further, a work piece fixing jig (not shown) is fixed to the plate 62. A work piece fixed to the work piece fixing jig rotates around the center 59 of FIG. 3. An oil seal 37 is positioned between the input shaft 35 and the input shaft housing 38. Since the output shaft 42a of the motor 42 has been inserted into the input shaft 35, oil within the reduction gear box 10 can be prevented from flowing out to the exterior even if the motor 42 is removed from a base 43 attached to the first pedestal 12.

X and Y in the figure refer to coordinate axes. The output shaft 42a of the motor 42 extends along the X axis direction, and revolves around the X axis. As a result, the first gear 34 also revolves around the X axis. Consequently, the second gear 44 that is engaged with the first gear 34 revolves around the Y axis. The direction of rotation is thus changed by the first gear 34 and the second gear 44. The reduction ratio can also be modified simultaneously with changing the direction of rotation by adjusting the number of teeth of the first gear 34 and the second gear 44. Rotative speed R2 of the second gear is represented by the following formula:

$$R2 = -R1 \times Z1/Z2 \quad (1)$$

In the above formula, R1 is the rotative speed of the motor 42 and the first gear 34, Z1 is the number of teeth of the first gear 34, and Z2 is the number of teeth of the second gear 44.

The rotation transmitted to the second gear 44 is transmitted to the crank shaft 60a that is spline coupled with the intermediate shaft 66b. As described above, when the crank shaft 60a rotates around the center 60x, the eccentric cams 61a and 61b revolve orbitally around the center 60x. As a result, the external gears 54a and 54b revolve orbitally as shown by the arrow 57. That is, the external gears 54a and 54b oscillate at the inner side of the internal gear 52 while in a meshing state with the internal gear 52. The rotation of the external gears 54a and 54b is restrained. When the external gears 54a and 54b whose rotation is restrained oscillate while in a meshing state with the internal gear 52, the internal gear 52 rotates due to the number of teeth of the external gears 54a and 54b differing from the number of teeth of the internal gear 52. The external gears 54a and 54b revolve orbitally while maintaining the symmetrical relationship in which the center of orbital revolution 59 is positioned between the two, and the entirety of the crank shaft 60a, and the external gears 54a and 54b revolve smoothly in a state in which revolution balance is ensured. The external gears 54a and 54b revolve orbitally together with the rotation of the crank shafts 60e and 60i.

Rotative speed R of the internal gear 52 is represented by the following formula:

$$R = R3 \times (Z4-Z3)/Z4 \quad (2)$$

In the above formula, R3 is the rotative speed of the crank shaft 60, Z4 is the number of teeth of the internal gear 52, and Z3 is the number of teeth of the external gears 54. Further, since the second gear 44 and the crank shaft 60 rotate at the same speed, the following formula is realized:

$$R2 = R3 \quad (3)$$

From the above formulae (1), (2), and (3):

$$R = -(R1 \times Z1 \times (Z4-Z3)/(Z2 \times Z4)) \quad (4)$$

The reduction gear box 10 of the present embodiment is capable of changing the revolution speed R1 of the motor 42 to the revolution speed R represented by formula (4).

Second Embodiment

Figure 4:
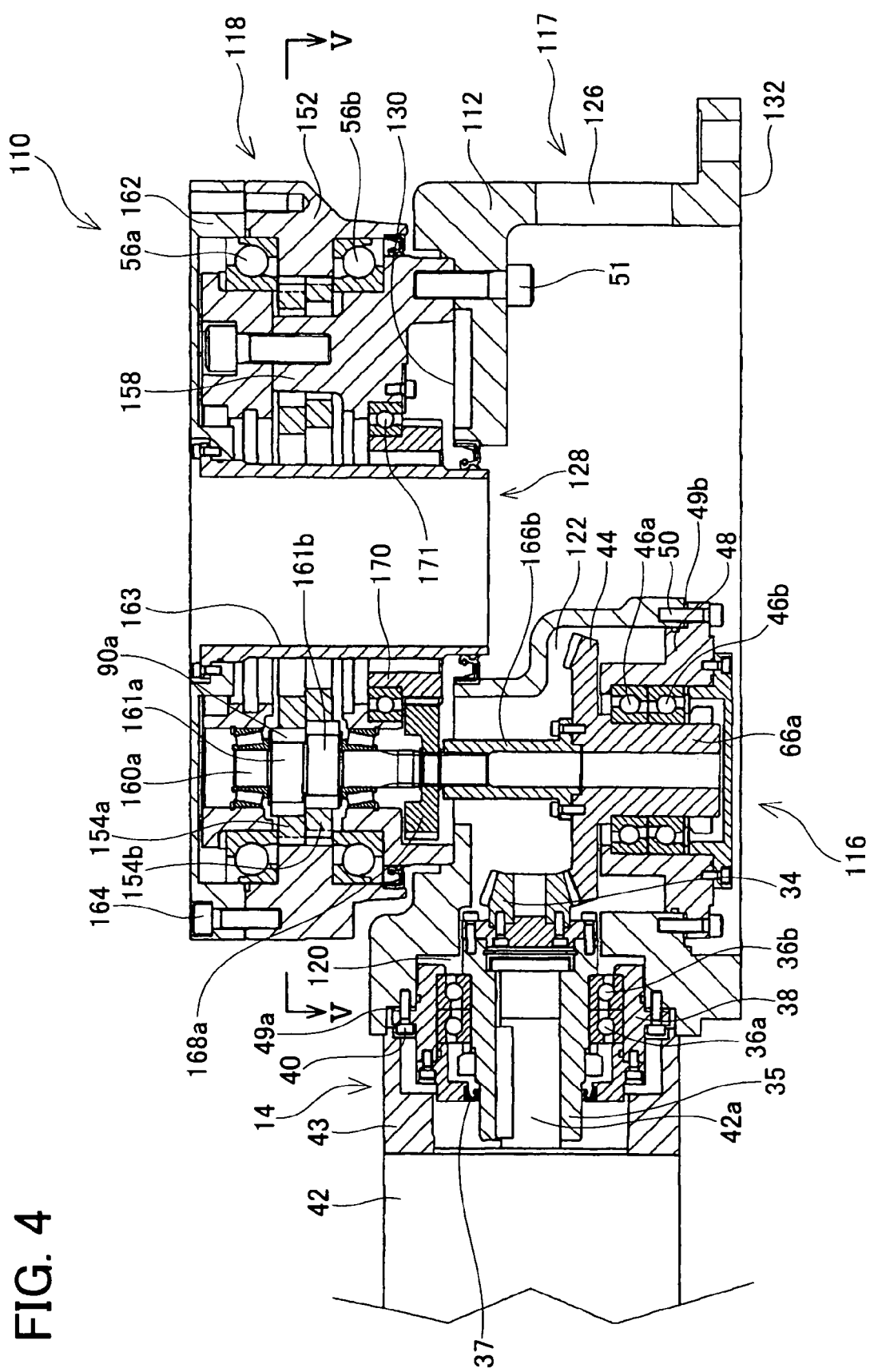
FIG. 4 shows a reduction gear box of a second embodiment.
Figure 5:
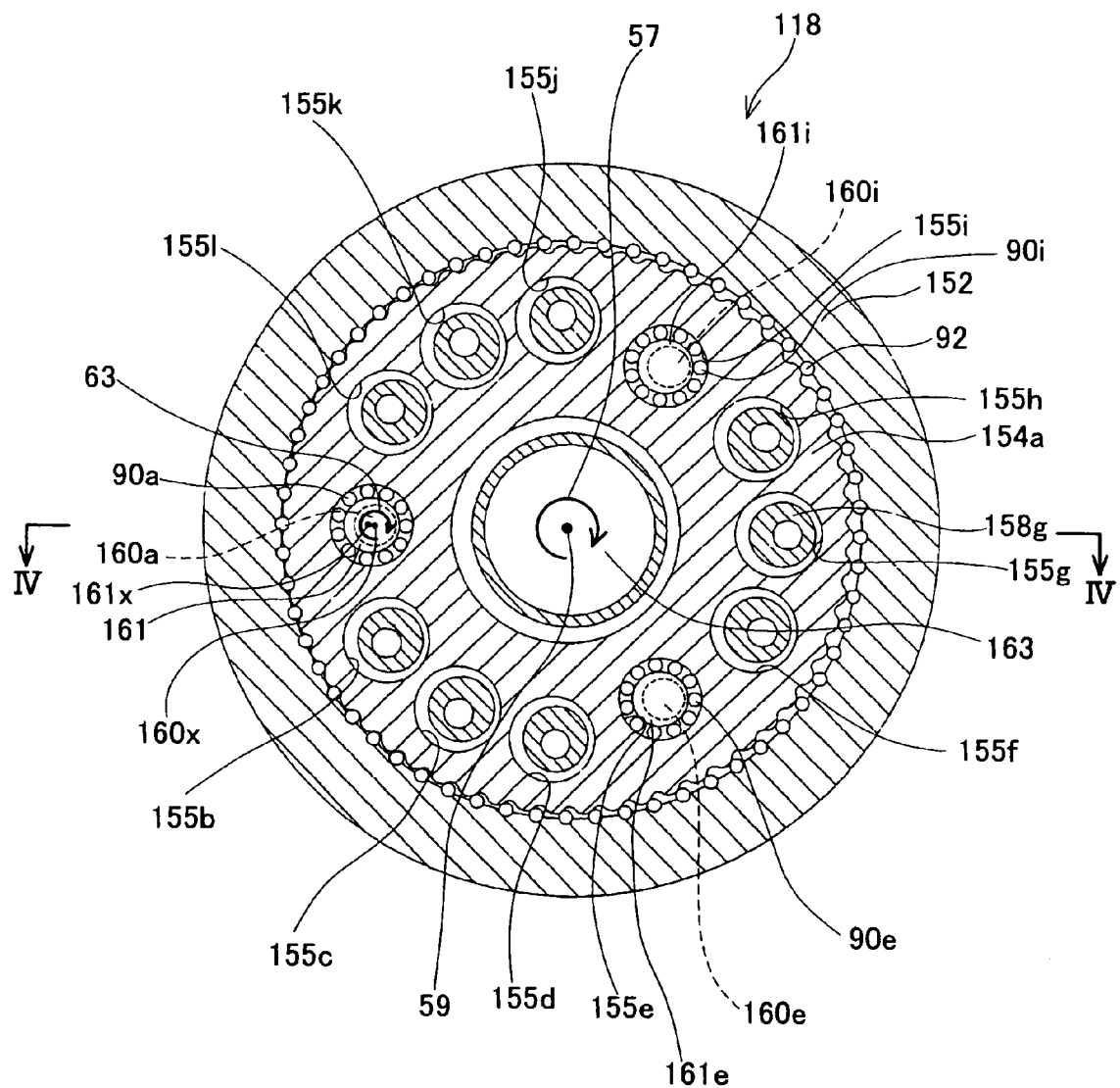
FIG. 5 shows a cross-sectional view along the line V-V of FIG. 4.

FIG. 4 shows a cross-sectional view of essential parts of a reduction gear box 110 of a second embodiment. FIG. 5 shows a cross-sectional view along the line V-V of FIG. 4. Here, only parts differing from those of the first embodiment will be described. Parts that are the same as those of the first embodiment have the same reference numbers applied thereto, or have reference numbers with the same two last digits, and a duplicated description thereof may be omitted.

In the first embodiment, the crank shafts 60e and 60i shown in FIG. 3 are caused to rotate together with the oscillation (orbital revolution) of the external gears 54a and 54b. The crank shafts 60e and 60i are passive and do not prevent the oscillation (orbital revolution) of the external gears 54a and 54b.

In the second embodiment, crank shafts 160e and 160i are caused to rotate by an intermediate shaft 166b, and driving force to cause oscillation (orbital revolution) of external gears 154a and 154b is transmitted by the crank shafts 160e and 160i to these external gears 154a and 154b. In the second embodiment, gears 168a, 168e, 168i, and 170 are added for transmitting the rotation of the intermediate shaft 166b to the crank shafts 160e and 160i. The gears 168e and 168i are not shown.

A flat gear 168a is fixed to the crank shaft 160a, and rotates integrally with the rotation of the crank shaft 160a. A flat gear 170 is supported, via a bearing 171, with respect to a second pedestal 158 such that the flat gear 170 is capable of rotating around the same center as the center of an internal gear 152. The gear 168e is fixed to the crank shaft 160e, and the gear 168i is fixed to the crank shaft 160i. The gears 168e and 168i engage with the flat gear 170. As a result, when the intermediate shaft 166b rotates, the flat gear 170 rotates, and the crank shafts 160a, 160e, and 160i rotate.

As a result, all of the crank shafts 160a, 160e, and 160i rotate individually, and the external gears 154a and 154b are caused to oscillate (orbitally revolve).

It is not necessary to re-adjust the pressure applied to the crank shafts 160a, 160e, and 160i of a reduction unit 118 after the reduction unit 118 and a rotation direction converting unit 117 have been joined together.

Third Embodiment

Figure 6:
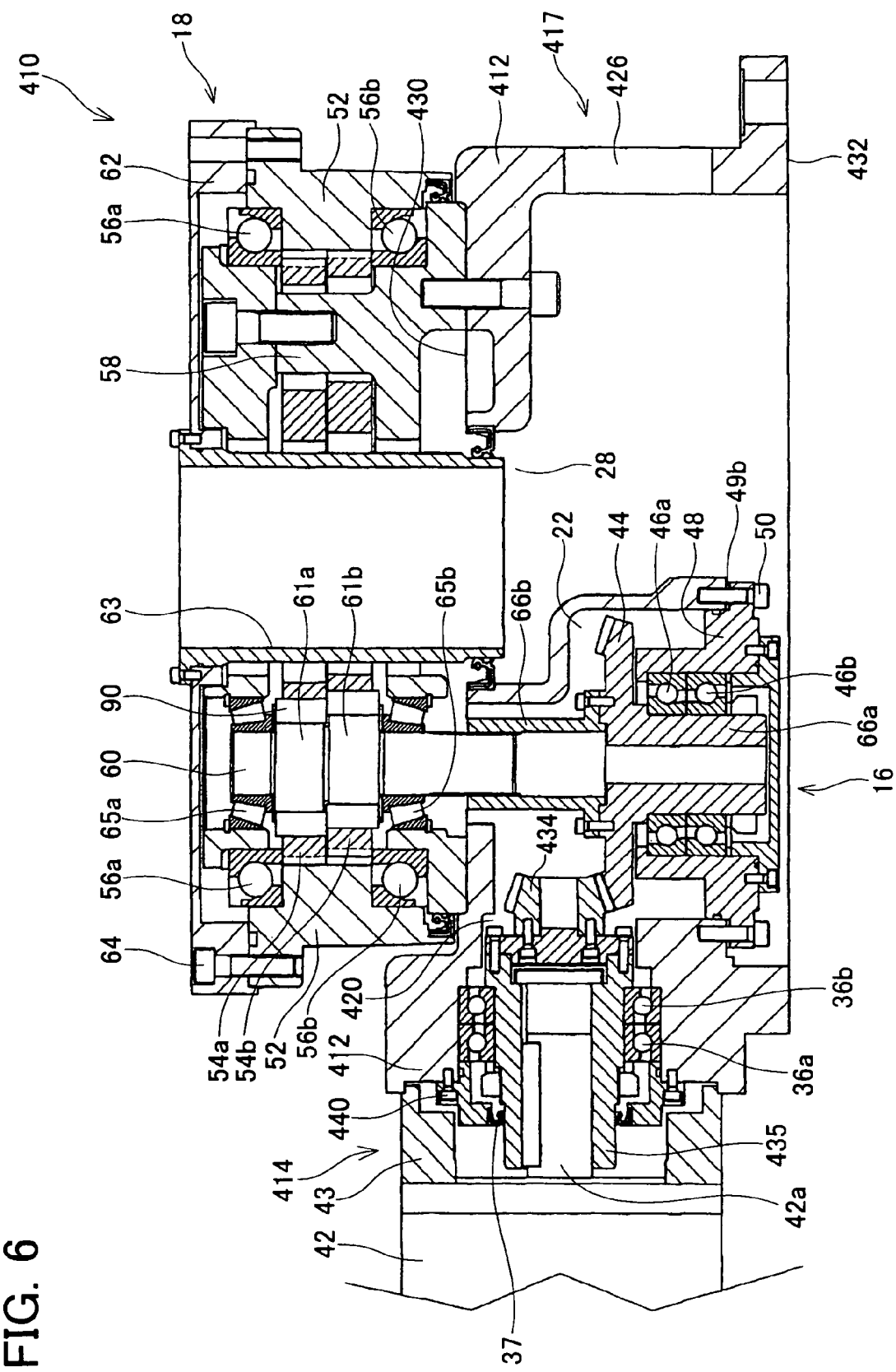
FIG. 6 shows a reduction gear box of a third embodiment.

FIG. 6 shows a cross-sectional view of essential parts of a reduction gear box 410 of a third embodiment. The reduction gear box 410 is a variant of the reduction gear box 10 of the first embodiment. In the reduction gear box 410, an input shaft 435 and a first gear 434 are not unitized. The input shaft 435 and the first gear 434 are fixed directly to a first pedestal 412 via the pair of angular bearings 36a and 36b. In the case where the external diameter of the first gear 434 is smaller than the external diameter of the input shaft 435, the input shaft 435 and the first gear 434 do not require an input housing due to their being fixed directly to the first pedestal 412 via the pair of angular bearings 36a and 36b.

Even if a part of a revolving member is joined directly to the first pedestal 412, it is possible to manufacture a high-quality manufactured part simply without unitizing all parts as long as a structure is provided in which the reduction mechanism is unitized and is joined to the first pedestal.

Fourth Embodiment

Figure 7:
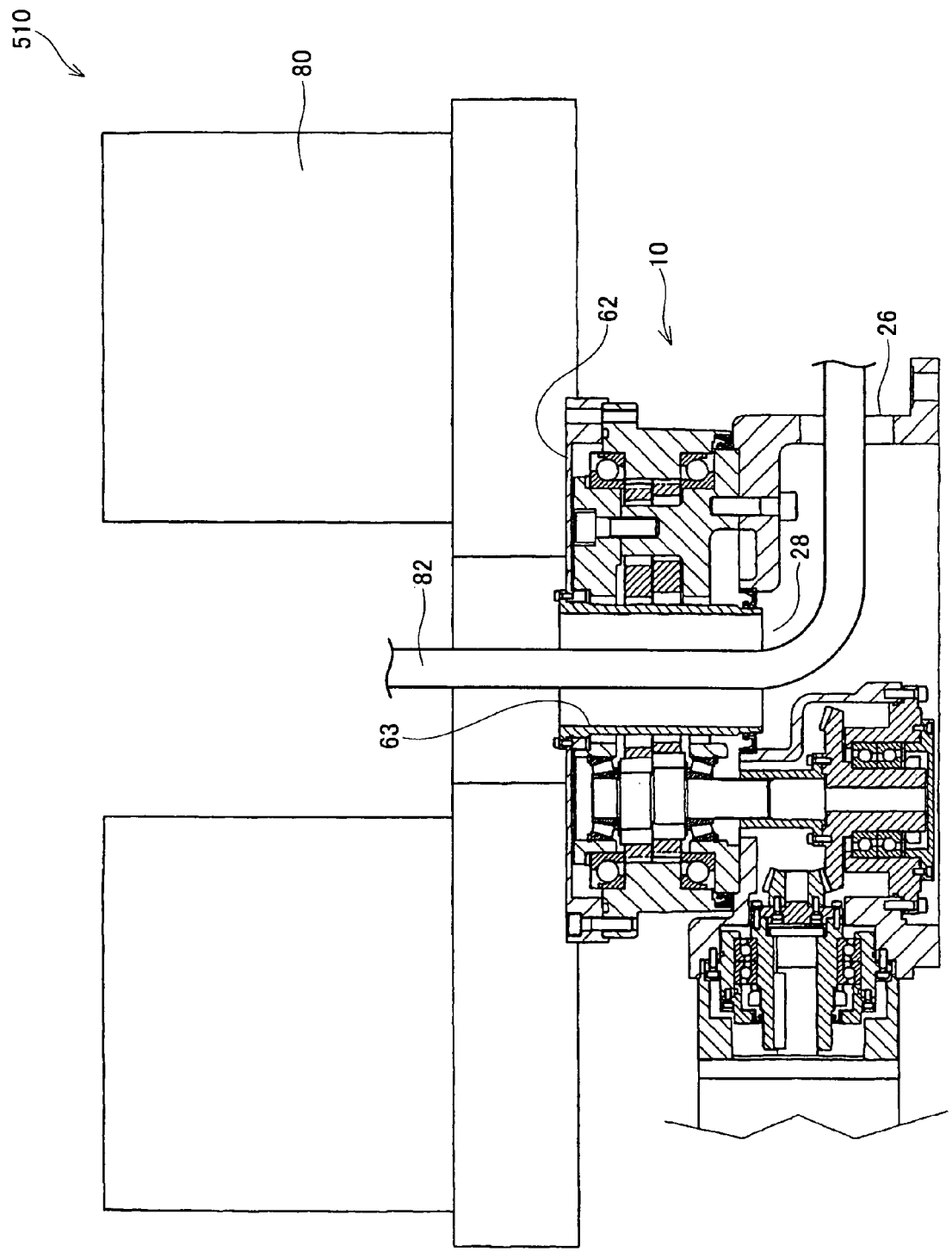
FIG. 7 shows a reduction gear box of a fourth embodiment.

FIG. 7 shows a work piece supporting device 510. The work piece supporting device 510 comprises a jig 80 that fixes a work piece (an object being worked upon) to the plate 62 of the reduction gear box 10 of the first embodiment.

A power source cable or the like 82 passes from the bottom of the reduction gear box 10 to the top thereof. The power source cable or the like 82 passes through the hole 26 of the first pedestal 12, the hole 28 of the first pedestal 12, and through the interior of the cylinder 63 of the reduction unit 18. The present embodiment applies the reduction gear box 10 of the first embodiment as a revolution device of a positioner (a work piece supporting device).

Fifth Embodiment

In the first embodiment and the second embodiment, the rotation of the external gears 54a and 54b or the external gears 154a and 154b is restrained, and speed reduction is achieved utilizing the phenomenon that when the external gears 54a and 54b or the external gears 154a and 154b revolve orbitally within the internal gear 52 or the internal gear 152, the internal gear 52 or the internal gear 152 rotates. In the fifth embodiment, the rotation of the internal gear is restrained. When the external gears revolve orbitally within the internal gear whose rotation has been restrained, a phenomenon is achieved in which the external gears rotate. In the fifth embodiment, speed reduction is achieved utilizing this phenomenon. In the fifth embodiment, rotation around a fixed point is achieved due to the outer gears rotating while revolving orbitally, and consequently a carrier is utilized. In the fifth embodiment, the carrier is an output shaft. Moreover, in the present embodiment, an internal gear 252 forms a second pedestal.

Figure 8:
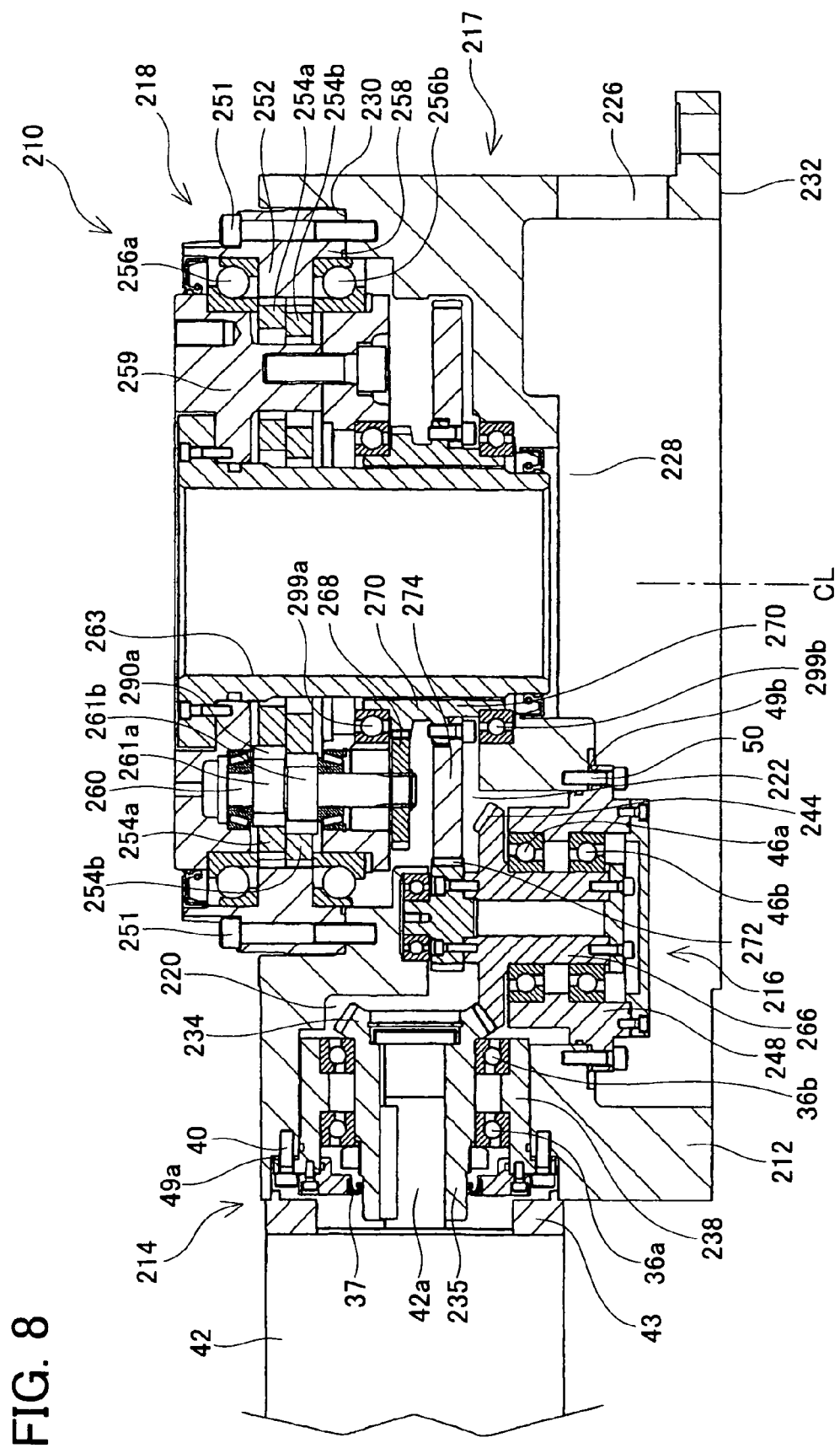
FIG. 8 shows a reduction gear box of a fifth embodiment.

FIG. 8 shows a cross-sectional view of essential parts of a reduction gear box 210 of the fifth embodiment. Here, only parts differing from those in the first embodiment will be described. Parts that are the same as those in the first embodiment have the same reference numbers applied thereto, or have reference numbers with the same two last digits, and a duplicated description thereof may be omitted.

The internal gear 252 is fixed to a first pedestal 212, and the rotation of the internal gear 252 is restrained. Instead, a carrier 259 is supported, with respect to the first pedestal 212 and the internal gear 252, by bearings 256a and 256b such that the carrier 259 is capable of rotating. The carrier 259 has a cylinder 263 fixed thereto, and is capable of rotating around a center line CL of the internal gear 252.

Three crank shafts 260 are supported by the carrier 259 so as to be capable of rotation. The three crank shafts 260 are present at positions separated by 120 degrees in a circumference direction, and only one crank shaft 260 is shown in FIG. 8.

The crank shafts 260 are the same as in the second embodiment, and their relationship with external gears 254a and 254b is also the same as in the second embodiment.

A flat gear 268 is fixed to a lower end part of each of the crank shafts 260. The flat gear 268 is engaged with a small diameter tooth portion at an upper side of a gear 270. The gear 270 that rotates around the cylinder 263 and the center line CL is disposed at the outer circumference of the cylinder 263, and is separated from this cylinder 263. The gear 270 is supported by a pair of bearings 299a and 299b so as to be capable of rotating with respect to the first pedestal 212 and the carrier 259. A gear 274 is fixed to a lower side of the gear 270, and is meshed with a third gear 272 fixed to an intermediate shaft 266.

When the motor 42 revolves, an input shaft 235 and a first gear 234 rotate, a second gear 244, the intermediate shaft 266, and the third gear 272 rotate, the gear 270 rotates, each of the three flat gears 268 rotates, each of the three crank shafts 260 rotates, the external gears 254a and 254b revolve orbitally, and as a result the external gears 254a and 254b rotate, the three crank shafts 260 revolve orbitally, and the carrier 259 rotates around the center line CL.

In the reduction gear box 210, the input shaft 235, the first gear 234, the second gear 244, the intermediate shaft 266, and the third gear 272 are fixed in position in the first pedestal 212, and a rotation direction converting unit 217 is formed therefrom. Further, the gear 270, the three flat gears 268, the three crank shafts 260, the carrier 259, the external gears 254a and 254b, etc. are fixed in position in a second pedestal 258 that is integral with the internal gear 252, and a reduction unit 218 is formed therefrom. The rotation direction converting unit 217 and the reduction unit 218 are fixed by a bolt 251 or the like.

The operation of the reduction gear box 210 will now be described. Rotation transmitted to the second gear 244 is transmitted to the third gear 272 that is coupled with the second gear. The rotation transmitted to the third gear 272 is transmitted to the gear 270 by the gear 274. The rotation transmitted to the gear 270 is transmitted to the three crank shafts 260 by the three flat gears 268. The rotation of the crank shafts 260 is transmitted to the external gears 254a and 254b, causing these external gears 254a and 254b to oscillate (revolve orbitally). Since the internal gear 252 is fixed to the first pedestal 212 by the bolt 251, the internal gear 252 does not rotate. As a result, the oscillating movement transmitted to the external gears 254a and 254b from the crank shafts 260 causes the carrier 259 to rotate around the center line CL.

The method of manufacturing the reduction gear box 210 will now be described.

The first pedestal 212, an input shaft unit 214, an intermediate shaft unit 216, and the reduction unit 218 are each completed separately. The manufacturing method of each of these is essentially the same as in the first embodiment, and consequently a description thereof may be omitted. Next, the input shaft unit 214 is inserted into a first hole 220 of the first pedestal 212, and the intermediate shaft unit 216 is inserted into a second hole 222 of the first pedestal 212. The engagement of the first gear 234 and the second gear 244 is adjusted, and the input shaft unit 214 and the intermediate shaft unit 216 are fixed to the first pedestal 212.

Next, the reduction unit 218 is inserted into the first pedestal 212. Thereupon, the gear 274 meshes with the third gear 272. The reduction unit 218 is fixed to the first pedestal 212 in this state.

The gear 270 and the gear 274 that couple the intermediate shaft 266 and the crank shafts 260 are housed in a space that is maintained between the rotation direction converting unit and the reduction unit. The intermediate shaft 266 and the crank shafts 260 are coupled by the flat gears 270, 274, and 268. The positional relationship of the flat gears 270, 274, and 268 in the axial direction does not require a high degree of accuracy. Further, the flat gears 270, 274, and 268 do not operate force in the axial direction between the intermediate shaft 266 and the crank shafts 260.

Specific examples of the present invention are described above in detail, but these examples are merely illustrative and place no limitation on the scope of the patent claims. The technology described in the patent claims also encompasses various changes and modifications to the specific examples described above.

In the fourth embodiment, the first gear of the reduction gear box of the first embodiment is not unitized. However, the second gear instead may not be unitized, or both the first gear and the second gear may not be unitized. Further, the first gear and/or the second gear may not be unitized in the reduction gear box of the second embodiment. Further, the first gear and/or the second gear may not be unitized in the reduction gear box of the third embodiment.

In the fifth embodiment, the jig is fixed on the reduction gear box of the first embodiment. However, the jig may be fixed on the reduction gear box of the second embodiment, the third embodiment, or the fourth embodiment.

In the above embodiment, the jig for supporting the work piece is fixed on the output shaft. However, a turntable provided with a jig may equally well be fixed on the output shaft.

Further, a flat plate for covering a supporting member of the reduction gear box may be fixed on the internal gear or the external gear. Furthermore, the jig for supporting the work piece or the turntable provided with the jig may be fixed on the flat plate.

In the above embodiments, the reduction gear box can be utilized in a robot swivel device. In this case, the first pedestal is a base of the robot, and a robot swivel arm is attached to the output shaft of the reduction gear box. The robot swivel arm can be made to revolve, and the speed of revolution of the robot arm can be adjusted as desired.

Further, the reduction gear box described in the above embodiments can be utilized as a revolution device of a positioner. In this case, the first pedestal can be utilized as a mounting on a bottom surface.

Furthermore, the technical elements explained in the present specification and drawings provide technical value and utility either independently or through various combinations. The present invention is not limited to the combinations described at the time the claims are filed. Further, the purpose of the example illustrated by the present specification and drawings is to satisfy multiple objectives simultaneously, and satisfying any one of those objectives gives technical value and utility to the present invention.

The invention claimed is:

1. A reduction gear box comprising:
a rotation direction converting unit that comprises a first pedestal including a first flat face, an input shaft supported rotatably in the first pedestal, an intermediate shaft supported rotatably in the first pedestal in a position substantially orthogonal to the input shaft, a first gear that rotates integrally with the input shaft, and a second gear that meshes with the first gear and rotates integrally with the intermediate shaft, wherein the input shaft is adapted to detachably couple to an output shaft of a motor independent of a meshed state of the first and second gears; and
a reduction unit that comprises a second pedestal including a second flat face making surface contact with the first flat face, an internal gear, an external gear housed within the internal gear, and a crank shaft supported in the second pedestal, the crank shaft configured to rotate with respect to the second pedestal and be incapable of moving in its axial direction, the crank shaft having an eccentric cam that engages with the external gear and causes the external gear to revolve orbitally in the internal gear by revolving eccentrically;
wherein the rotation direction converting unit and the reduction unit are joined together, by being fixed while the first flat face and the second flat face are in a state of making surface contact and in this positional relationship the intermediate shaft and the crank shaft are coupled such that they are configured to transmit torque and the intermediate shaft is configured to move in an axial direction of the crank shaft,
wherein the rotation direction converting unit, the reduction unit and the motor are configured to be detached from each other without changing the meshed state of the first and second gears of the rotation direction converting unit and a configuration of the reduction unit, and
rotation generated by either the internal gear or the external gear with the rotation of the input shaft is transmitted to an output rotation member.

2. The reduction gear box according to claim 1, wherein the intermediate shaft of the rotation direction converting unit and the crank shaft of the reduction unit are joined by a spline coupling.

3. The reduction gear box according to claim 1, wherein the intermediate shaft of the rotation direction converting unit and the crank shaft of the reduction unit are joined by flat gears that rotate around an axis line parallel to the intermediate shaft and the crank shaft, such that the intermediate shaft and the crank shaft are configured to transmit torque.

4. The reduction gear box according to claim 3, wherein a space is formed between the rotation direction converting unit and the reduction unit in a case where the first flat face and the second flat face have been caused to make surface contact, and the flat gears that join together the intermediate shaft and the crank shaft are housed within the space.

5. The reduction gear box according to claim 1, wherein the input shaft and the first gear constructs a part of an input shaft unit, the input shaft unit further comprises an input shaft housing, and a pair of bearings positioned between the input shaft and the input shaft housing, wherein the pair of bearings supporting the input shaft such that the input shaft can rotate with respect to the input shaft housing and cannot move in its axial direction, the input shaft unit, which has been assembled in advance in a positional relationship in which the first gear is exposed at an anterior end of the input shaft housing, is inserted and fixed to a hole formed in the first pedestal.

6. The reduction gear box according to claim 1, wherein the intermediate shaft and the second gears constructs a part of an intermediate shaft unit, the intermediate shaft unit further comprises an intermediate shaft housing, and a pair of shaft bearings positioned between the intermediate shaft and the intermediate shaft housing, wherein the pair of shaft bearings supporting the intermediate shaft such that the intermediate shaft can rotate with respect to the intermediate shaft housing and cannot move in its axial direction, the intermediate shaft unit, which has been assembled in advance in a positional relationship in which the second gear is exposed at an anterior end of the intermediate shaft housing, is inserted and fixed to a hole formed in the first pedestal.

7. A reduction gear box comprising:
a rotation direction converting unit that comprises a first pedestal including a first flat face, an input shaft supported rotatably in the first pedestal, an intermediate shaft supported rotatably in the first pedestal in a position substantially orthogonal to the input shaft, a first gear that rotates integrally with the input shaft, and a second gear that meshes with the first gear and rotates integrally with the intermediate shaft; and
a reduction unit that comprises a second pedestal including a second flat face making surface contact with the first flat face, an internal gear, an external gear housed within the internal gear, and a crank shaft supported in the second pedestal, the crank shaft configured to rotate with respect to the second pedestal and be incapable of moving in its axial direction, the crank shaft having an eccentric cam that engages with the external gear and causes the external gear to revolve orbitally in the internal gear by revolving eccentrically; wherein
the rotation direction converting unit and the reduction unit are joined together, by being fixed while the first flat face and the second flat face are in a state of making surface contact and in this positional relationship the intermediate shaft and the crank shaft are coupled via an engagement area over a coextensive portion of their respective lengths in the axial direction and configured to transmit torque through the engagement area, and the intermediate shaft is configured to move in an axial direction of the crank shaft,
rotation generated by either the internal gear or the external gear with the rotation of the input shaft is transmitted to an output rotation member,
the input shaft is adapted to detachably couple to an output shaft of a motor, and wherein the rotation direction converting unit, the reduction unit and the motor are configured to be detached from each other without changing the meshed state of the first and second gears of the rotation direction converting unit and a configuration of the reduction unit.

8. The reduction gear box according to claim 7, wherein, in said positional relationship, the intermediate shaft and crank shaft are coaxially positioned.

9. The reduction gear box according to claim 7, wherein a rotational axis of the input shaft intersects the intermediate shaft.

10. The reduction gear box according to claim 7, wherein the crank shaft of the reduction unit extends in its axial direction beyond the second flat face of the second pedestal.

11. The reduction gear box according to claim 7, wherein the intermediate shaft of the rotation direction converting unit extends in its axial direction beyond the first flat face of the first pedestal.

12. The reduction gear box according to claim 7, wherein the intermediate shaft and the second gears constructs a part of an intermediate shaft unit, the intermediate shaft unit further comprises an intermediate shaft housing, and a pair of shaft bearings positioned between the intermediate shaft and the intermediate shaft housing, the intermediate shaft unit being mounted to the first pedestal.

13. The reduction gear box according to claim 12, wherein the intermediate shaft unit is mounted to the first pedestal at a position located at one side of a rotational axis of the input shaft and, when the rotation direction converting unit and the reduction unit are joined together, the second flat face of the second pedestal is located at the opposite side of the rotational axis of the input shaft.

* * * * *